US007348552B2

(12) United States Patent
Laser

(10) Patent No.: US 7,348,552 B2
(45) Date of Patent: Mar. 25, 2008

(54) PROCESS FOR MANUFACTURING A MULTIPOLAR ELECTRODE ARRANGEMENT AND MULTIPOLAR ELECTRODE ARRANGEMENT

(75) Inventor: Bernd Laser, Stuhr (DE)

(73) Assignee: VACUTEC Hochvakuum- & Präzisionstechnik GmbH, Bremen (DE)

( * ) Notice: Subject to any disclaimer, the term of this patent is extended or adjusted under 35 U.S.C. 154(b) by 319 days.

(21) Appl. No.: 11/270,985

(22) Filed: Nov. 11, 2005

(65) Prior Publication Data

US 2006/0102835 A1 May 18, 2006

(30) Foreign Application Priority Data

Nov. 12, 2004 (DE) ..................... 10 2004 054 835

(51) Int. Cl.
*B01D 59/44* (2006.01)

(52) U.S. Cl. ........................................ 250/281; 445/49

(58) Field of Classification Search ................ 250/281, 250/292, 396 R, 294; 445/49
See application file for complete search history.

(56) References Cited

U.S. PATENT DOCUMENTS 2,939,952 A * 6/1960 Helmut et al. .............. 250/292
4,158,771 A 6/1979 Beeck et al.
5,384,461 A * 1/1995 Jullien et al. ............... 250/292
5,389,785 A * 2/1995 Steiner et al. .............. 250/292
5,525,084 A * 6/1996 Broadbent et al. ............ 445/49
2003/0178564 A1* 9/2003 Kernan et al. .............. 250/292

FOREIGN PATENT DOCUMENTS

| | | |
|---|---|---|
| DE | 944900 | 6/1956 |
| DE | 2625660 | 12/1977 |
| DE | 19511248 | 9/1995 |
| DE | 69207183 | 5/1996 |
| EP | 0572687 | 12/1993 |
| JP | 58204464 | 11/1983 |

* cited by examiner

*Primary Examiner*—Nikita Wells
*Assistant Examiner*—Michael Maskell
(74) *Attorney, Agent, or Firm*—Collard & Roe, P.C.

(57) ABSTRACT

A method for the production of a multipolar electrode configuration (1) for focussing or mass filtration of a beam of charged particles includes attaching a number of round-pole shaped electrode blanks (9)—but only a fraction of the total number of electrodes (2) required for said electrode configuration (1)—to one or a number of support elements (4); simultaneous processing of the end parts (6) of the support element(s) (4) and of the electrode blanks (9) attached to the support element(s) (4) in one process step in such a way that each electrode blank (9) is processed into an electrode (2) with a cross section, having a circular section (KA) and a non-circular, section (HA), and at the end of said simultaneous processing the support element(s) (4) having two differently shaped end parts (6), whereby the respective shapes of said end parts (6) are adapted to each other.

11 Claims, 9 Drawing Sheets

Figure 1:
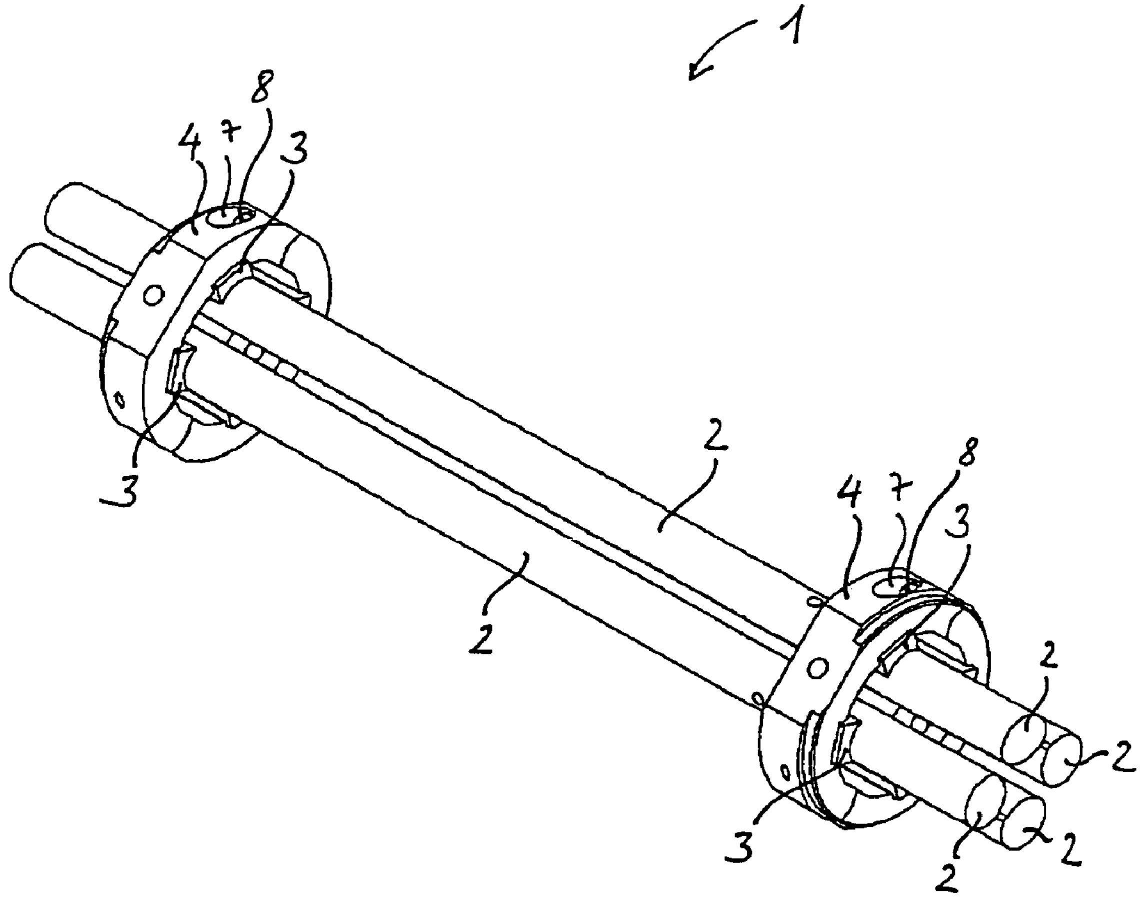

PROCESS FOR MANUFACTURING A MULTIPOLAR ELECTRODE ARRANGEMENT AND MULTIPOLAR ELECTRODE ARRANGEMENT

The invention relates to a method for the production of a multipolar electrode configuration for focussing or mass filtration of a beam of charged particles, where the configuration comprises a number of elongated electrodes which are orientated parallel to an axis.

The invention further relates to a multipolar electrode configuration, whereby a number of said electrodes are attached to one or a number of support elements which are formed separately from the electrodes and whereby each electrode comprises a cross-section with a circular section and a non-circular, preferably hyperbolical section.

Multipolar electrode configurations for the separation or for the separate detection of ions of different specific charge are well known from German patent specification 944 900, which describes the basic principles of mass spectrometers.

European patent application EP 0 572 687 A1 describes a special configuration of mass filters, which uses hyperbolically formed electrodes, made from preformed cast bodies, which are isolated from each other by isolation elements and are fitted together using screws.

It is further known for from German patent application DT 26 25 660 A1 to us hyperbolically formed electrode surfaces, which are attached in pairs to a ceramic body, whereby two of such ceramic bodies are held together by flanges.

It is further known from Japanese patent application JP 58204464A to insert electrodes with a specific cross section into a holder. Bulges are formed within a holder and subsequently the electrodes are attached to said bulges. The holder is shaped like a ring and encloses all four electrodes of the electrode configuration.

A method for the production of a glass-quadrupole is further known from German patent DE 195 11 248 A1.

US patent application 2003/0178564 A1 describes an electrode configuration whereby two electrodes and a ring-like holder are formed from one piece.

The described electrode configurations have the disadvantage that the electrodes have to be aligned very accurately using a very sophisticated alignment process whereby even the smallest misalignments, with respect to parallelism of the electrodes, can lead to undesired effects and analytical measurement errors.

In order to solve the described problem patent DE 692 07 183 T2 suggests to produce four, hyperbolically formed electrodes from one cylindrically formed blank using an electro-erosion process. It is the intention to avoid the time-consuming alignment process, which is required for other pre-formed electrodes.

The production method described in the previous patent has the disadvantage that it is based on electro-erosion, either on wire-electrode-erosion or on electro-erosion via a form piece. One disadvantage of said method is the roughness of the surfaces produced via the electro-erosion process. The wire-electrode-erosion has the additional disadvantage that it introduces inaccuracies in such areas where the wire bulges out during processing. The electro-erosion process using a specially shaped form-piece has the disadvantage that a significant amount of material has to be removed during the electro-erosion process and that the form piece has to be renewed repeatedly, which is especially problematic, since the production of the form piece itself requires a very sophisticated process. Additionally, the accuracy of producing the form piece is very limited which has the effect that the complete process becomes very labour intensive and expensive.

The current invention is based on the technical problem of how to improve the production process of electrodes in an electrode configuration. The current invention suggests a process that achieves a highly aligned electrode configuration with little effort.

The current invention solves this problem via a method for the production of multipole electrode configurations according to claim 1 and an electrode configuration according to claim 10.

According to the invention, a pole-like electrode blank forms the starting point of the process, which, subsequently together with other electrode blanks, is processed in such a way that one section of the electrode is formed hyperbolically. A pole-like electrode blank could mean either a solid pole-like electrode blank or a hollow pole-like electrode blank, i.e. an electrode blank that is formed in the shape of a pipe. The blank comprises a circular cross section. A hollow pole-like blank has the advantage that less material needs to be used. The wall thickness of the hollow pole-like electrode blank has to be selected in such a way that even after processing, the wall thickness is sufficient. Before processing the electrode blank is attached to at least one support element so that alignment after processing within the electrode configuration is not required.

Advantageously, two electrodes are attached to a front and a back support element or to a support element that extends, at least partially or entirely, along the electrodes or part of the electrodes. Electrodes and support elements are subsequently processed together, preferably via grinding of the electrode blanks with a grind stone, which is shaped in the negative form of the desired hyperbolic shape of the electrodes and of the end parts of the support element or support elements.

Preferably, two such produced half shells comprising two electrodes and two support elements are made and then joined with each other, in particular by bolting them together.

In a preferred embodiment each support element comprises two end parts whereby one of them has a convex shape and the other has a concave shape. The convex shape and the concave shape are designed in such a way that the convex shape of the support element fits neatly into the concave shape of the other support element in order to guarantee an exact positioning of both support elements with respect to each other. Preferably, the end parts of the support elements are processed at the same time as the electrode blanks so that these shapes can be created.

In a preferred embodiment, the electrode blanks are attached to the support elements upon insertion of at least one insulating member between the electrode blanks and the support element, in order to isolate the electrode blank from the support element. Preferably this insulating member consists of a non-conducting material, such as glass, quartz-glass or ceramic.

Preferably, each electrode blank and/or support element consists of graphite, a metal or an alloy with a small thermal expansion coefficient or linear expansion coefficient, for example less than $8 \cdot 10^{-6}$ $K^{-1}$. This expansion coefficient should, in general, be similar to the thermal—and linear expansion coefficient of the insulating member. Particularly, the difference between the expansion coefficients of graphite, metal or the alloy and the expansion coefficients of the insulating member must be less than $2 \cdot 10^{-6}$ $K^{-1}$. In this manner, a reliable and lasting connection between the metal and the insulating member can be achieved, for example via a soldering or gluing process. If the insulating member consists of glass or quartz glass the preferred material is a nickel-iron alloy which consists of, for example, 36 weight percent nickel and the remaining parts iron, and is distributed as material 1.3912 (German key to steel—Deutscher Stahlschlüssel) or under the name Invar 36. If the insulating member consists of ceramic the preferred material consists of an alloy formed mainly from nickel, iron and cobalt with 29 weight percent nickel, 53 weight percent iron and 17 weight percent cobalt which is distributed as material 1.3981 (German key to steel—Deutscher Stahlschlüssel) or under the name Vacon/Nilo Alloy K.

An electrode for such a multipole electrode configuration has preferably a cross section with a circular section and a section that is non-circular, but preferably substantially hyperbolical, whereby the angle α, with respect to the centre point of the circular section, formed by the intersection points of the circular section and the non-circular section is:

$$\alpha \geqq 45°$$

and the angle β, formed by the tangents in each of the intersection points is $$\beta \leqq 45°.$$

These specifications for the angles allow for a smooth transition from the hyperbolical electrode section to the circular electrode section. This transition area is, in general, very sensitive to field disturbances that can occur in said area which can lead to inaccurate analytical measurement results. This transition area is preferably formed without any sharp edges or spikes.

Figure 2:
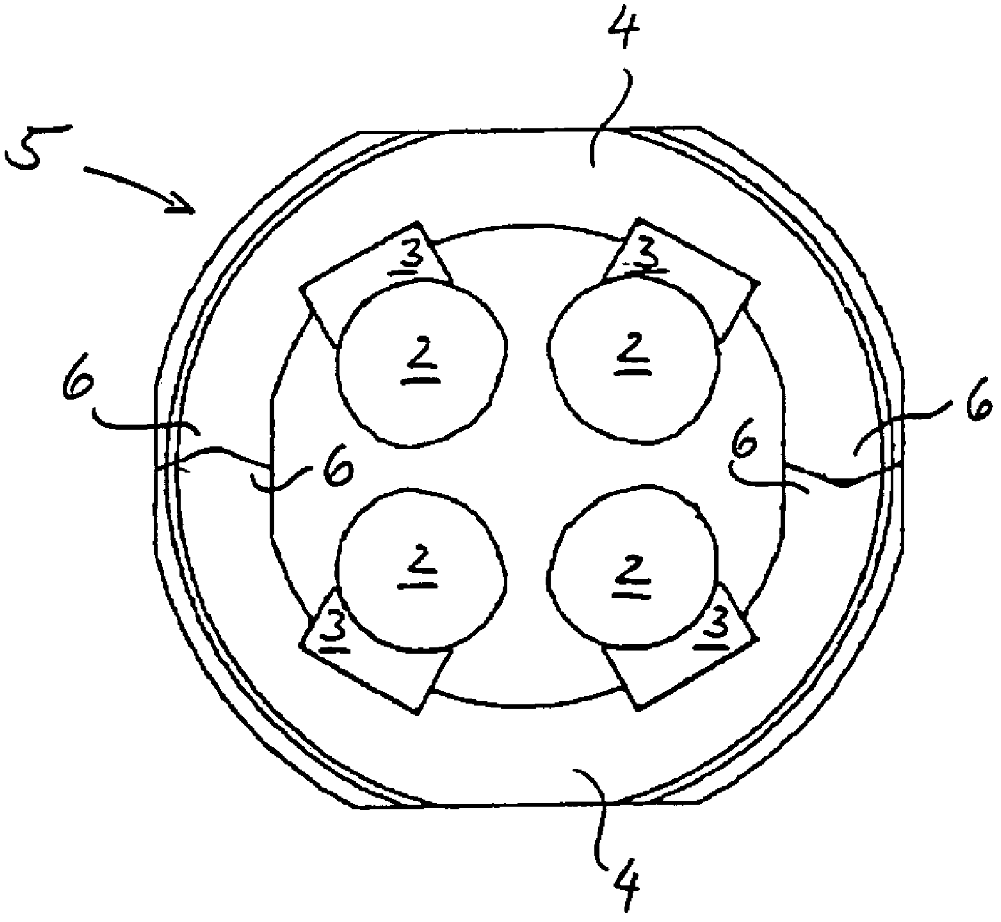
Figure 3:
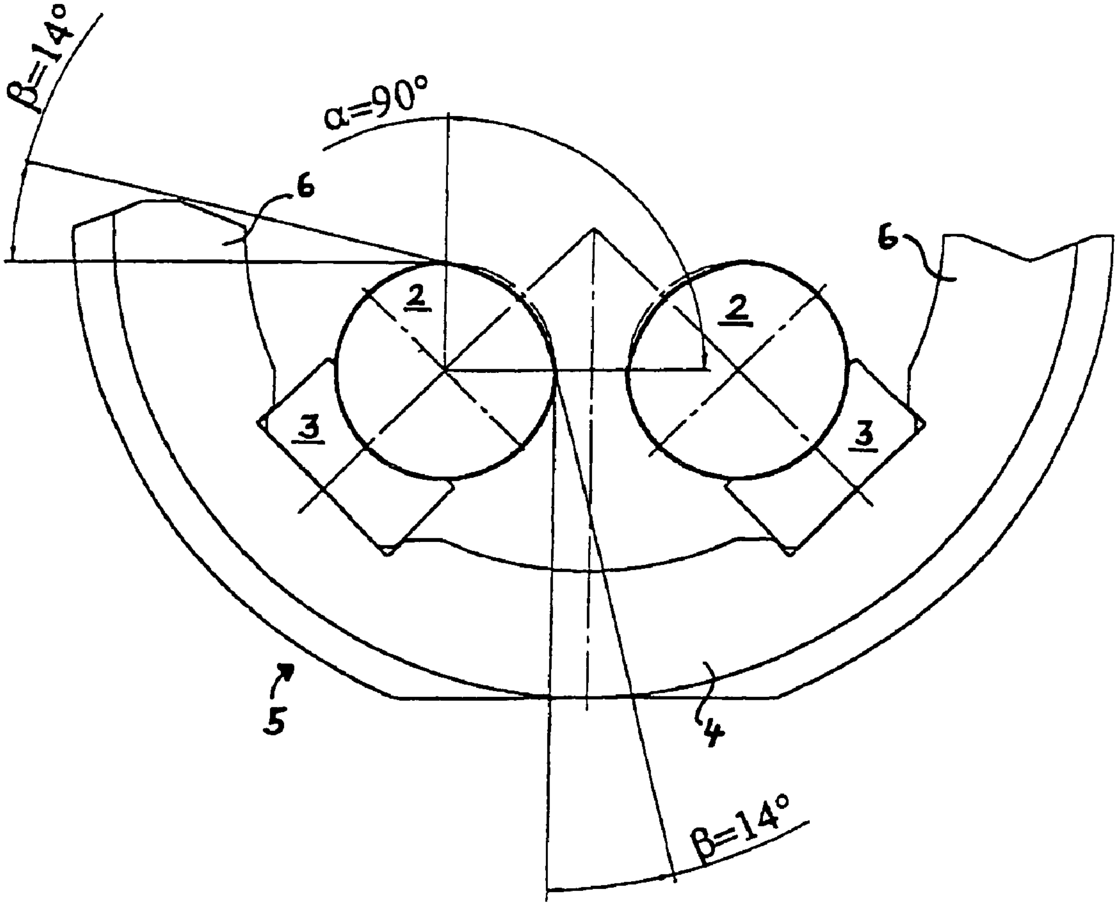
Figure 3A:
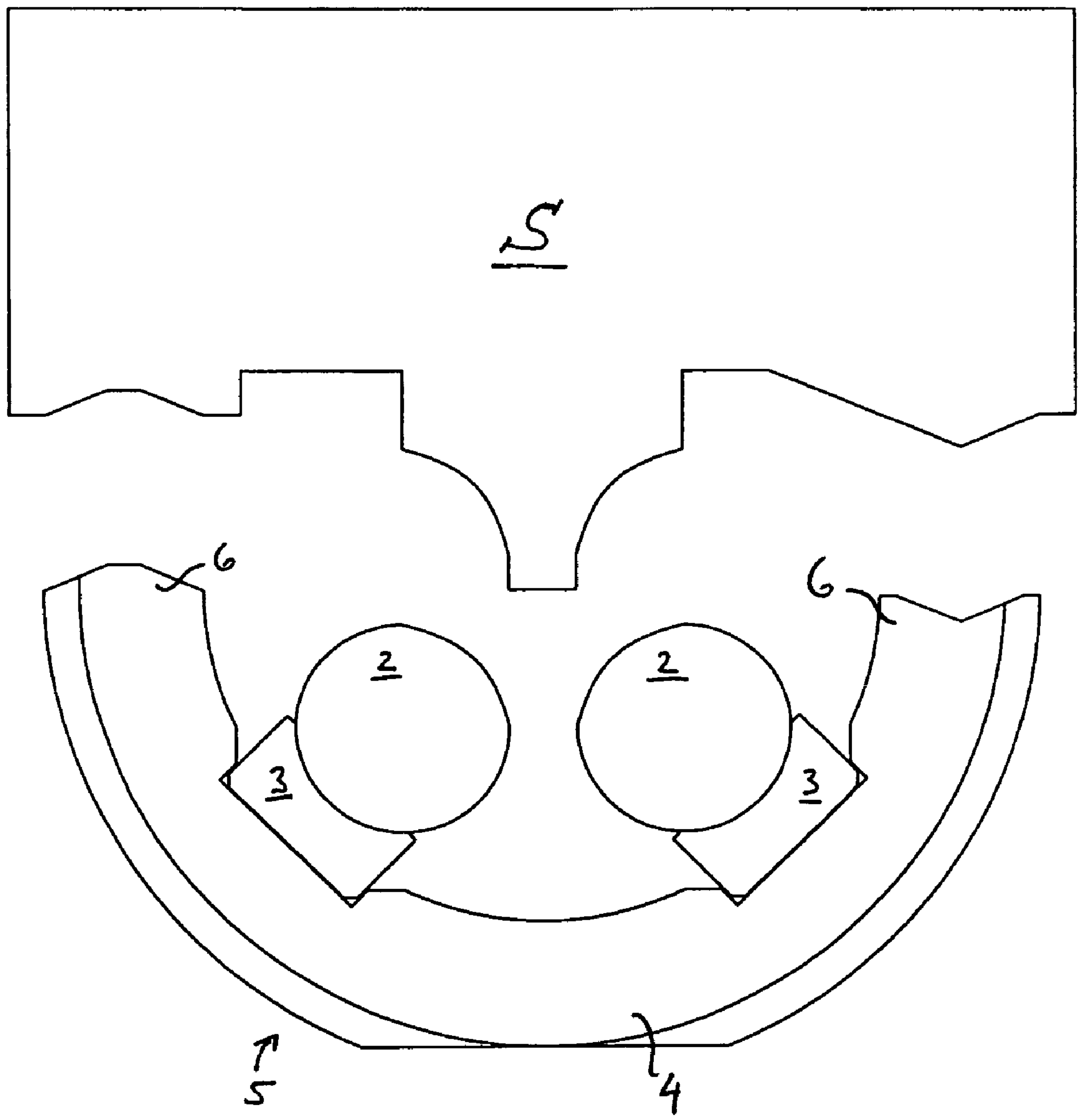
Figure 3B:
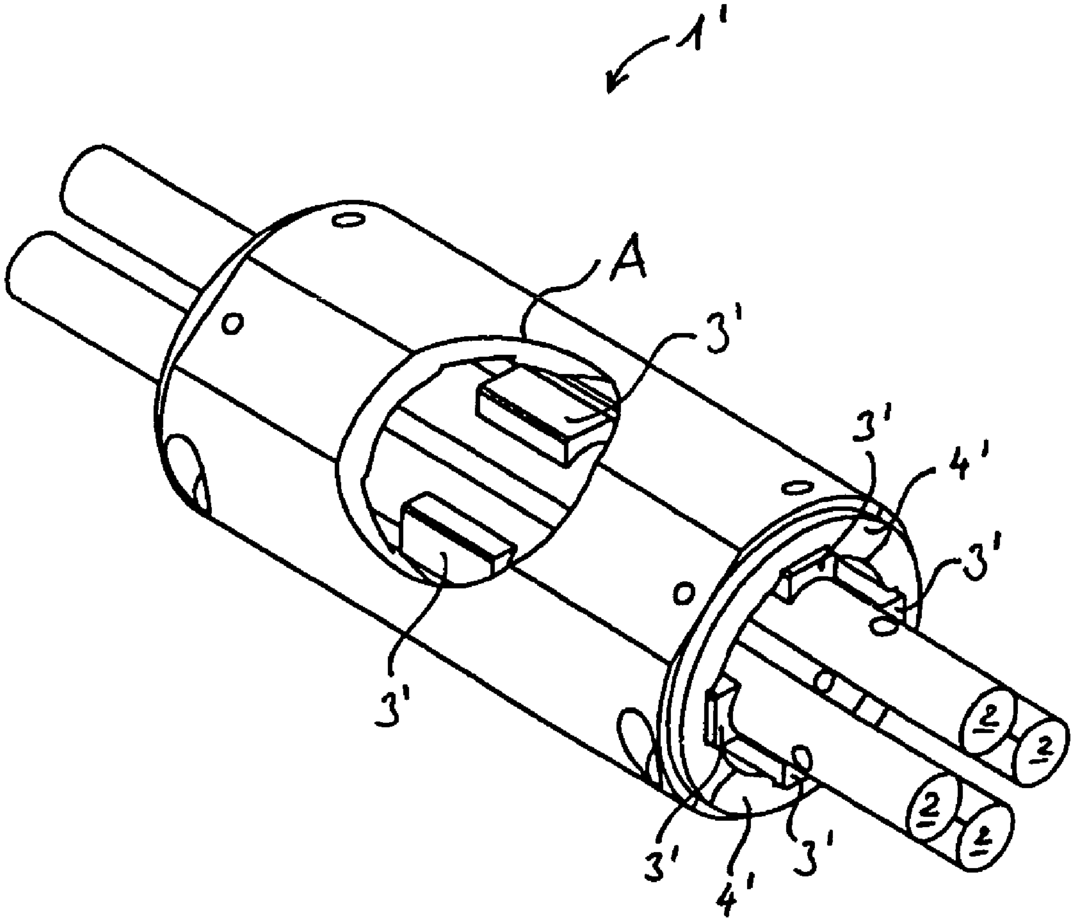
Figure 4:
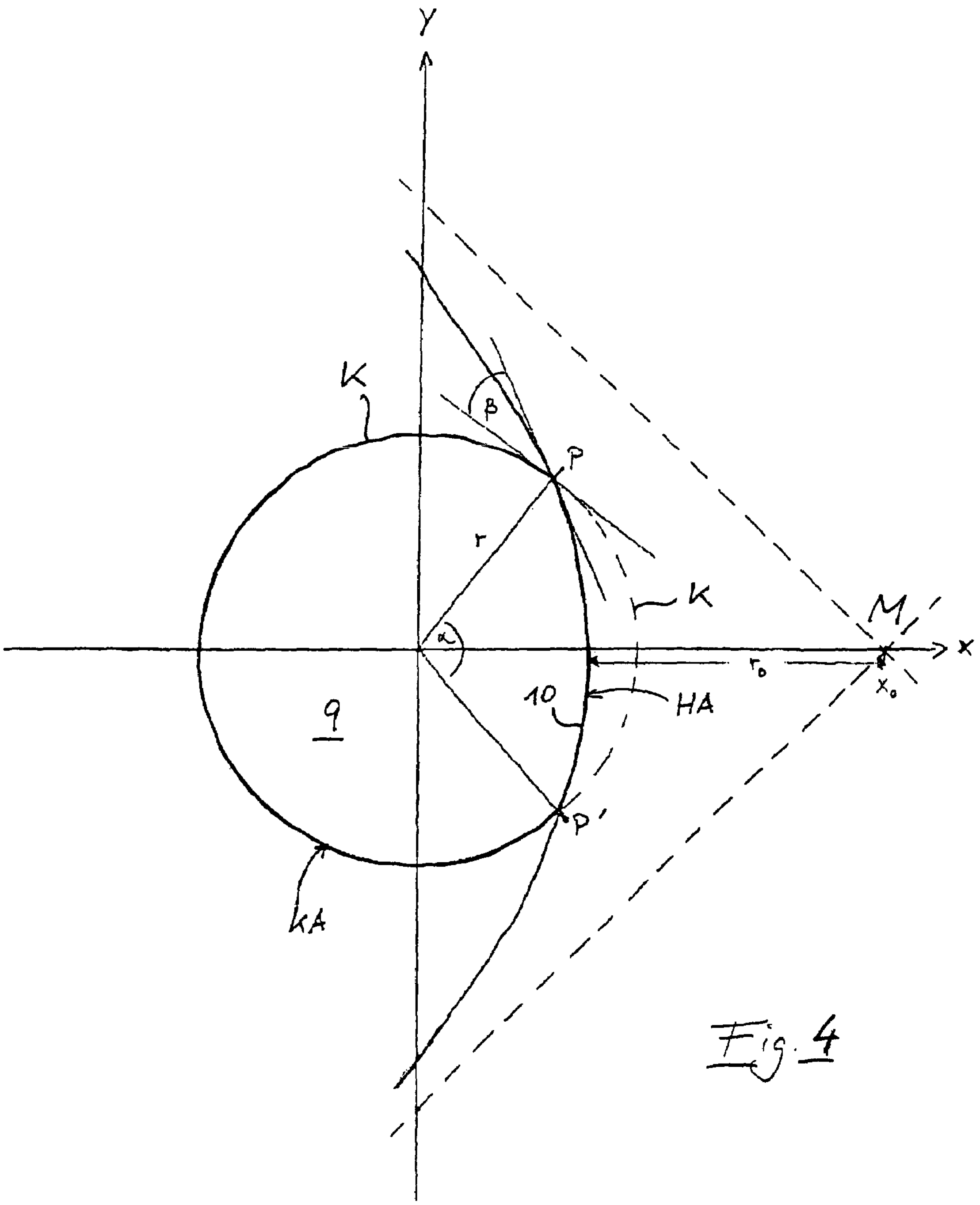
Figure 5:
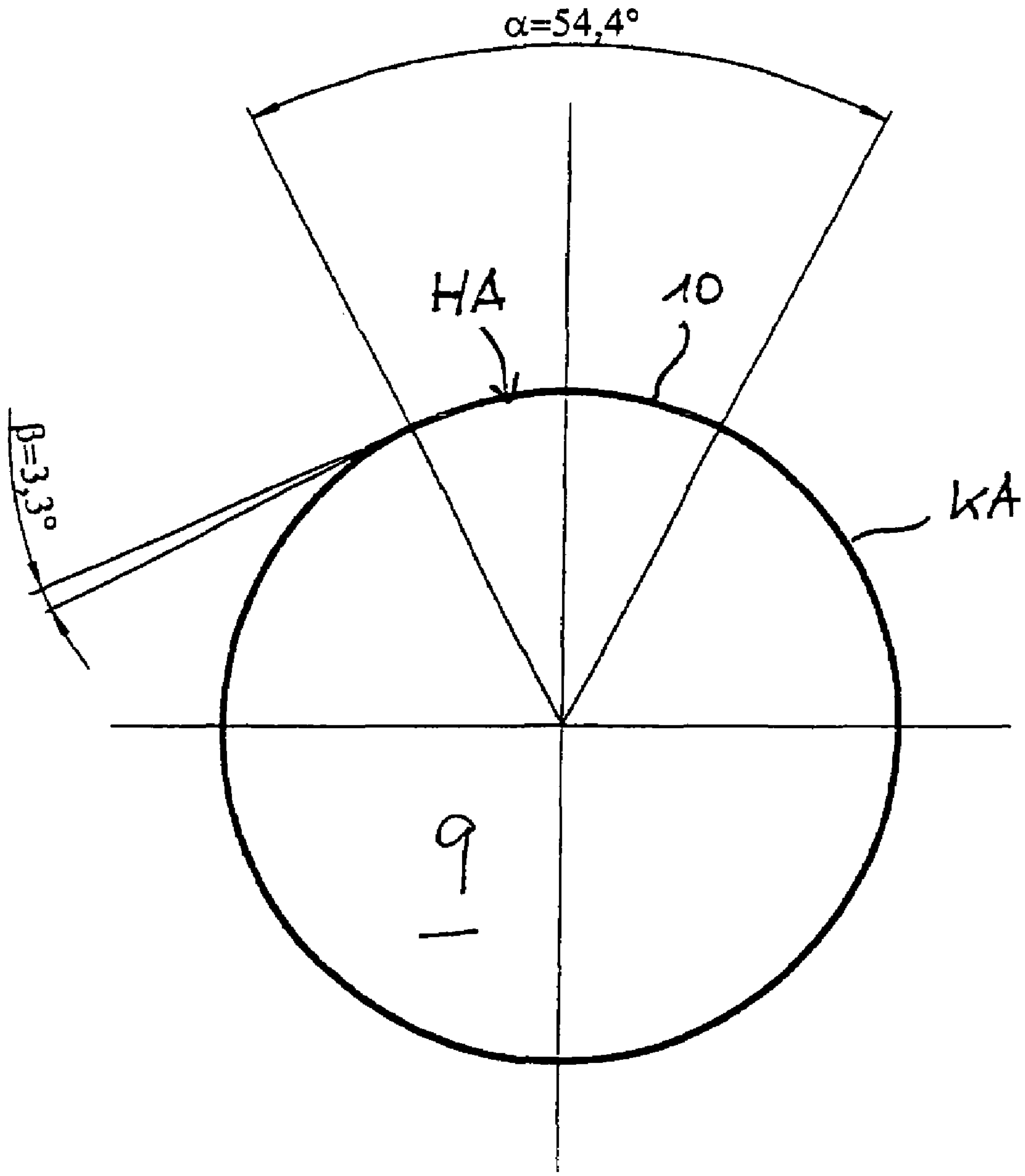
Figure 6:
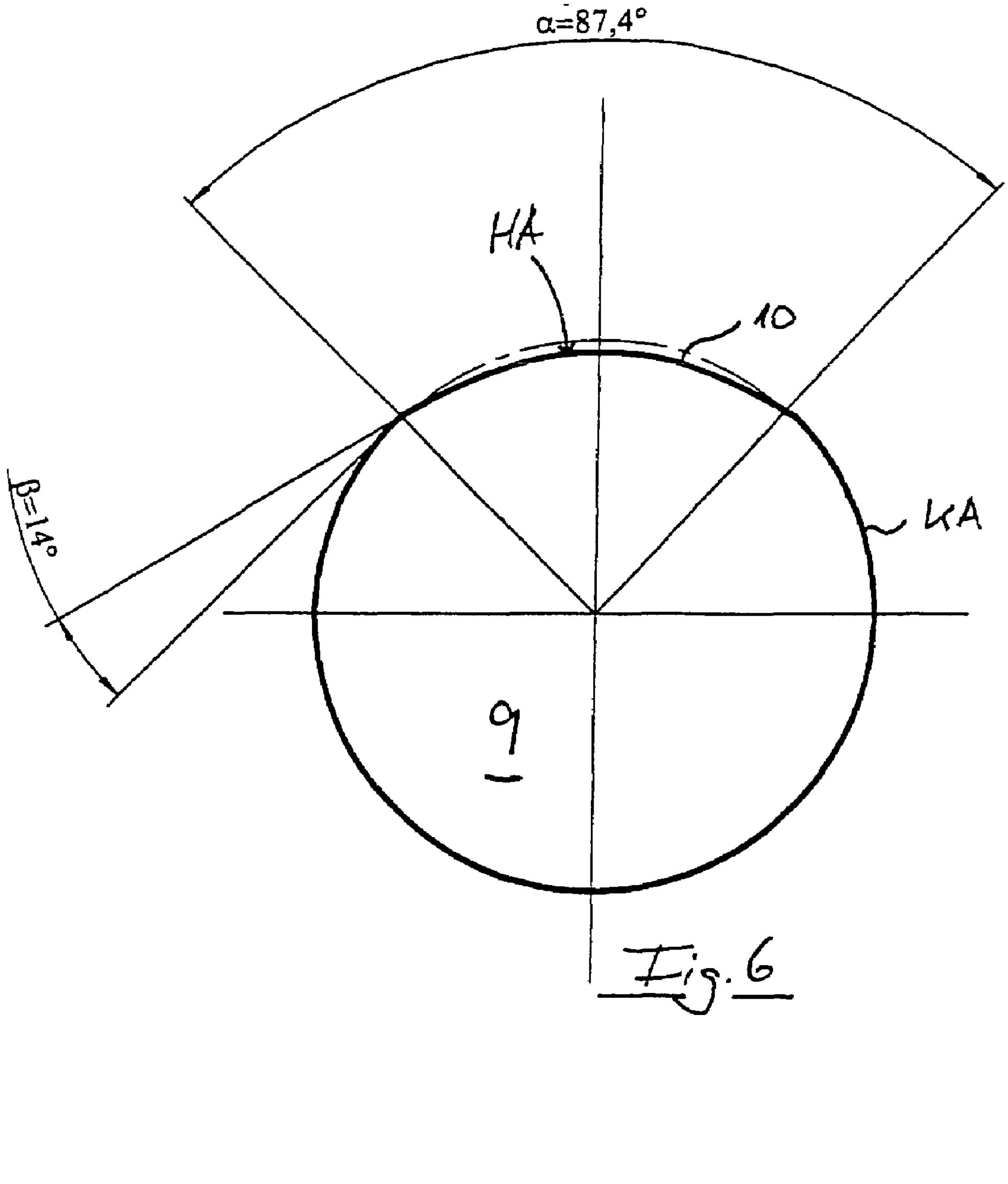
Figure 7:
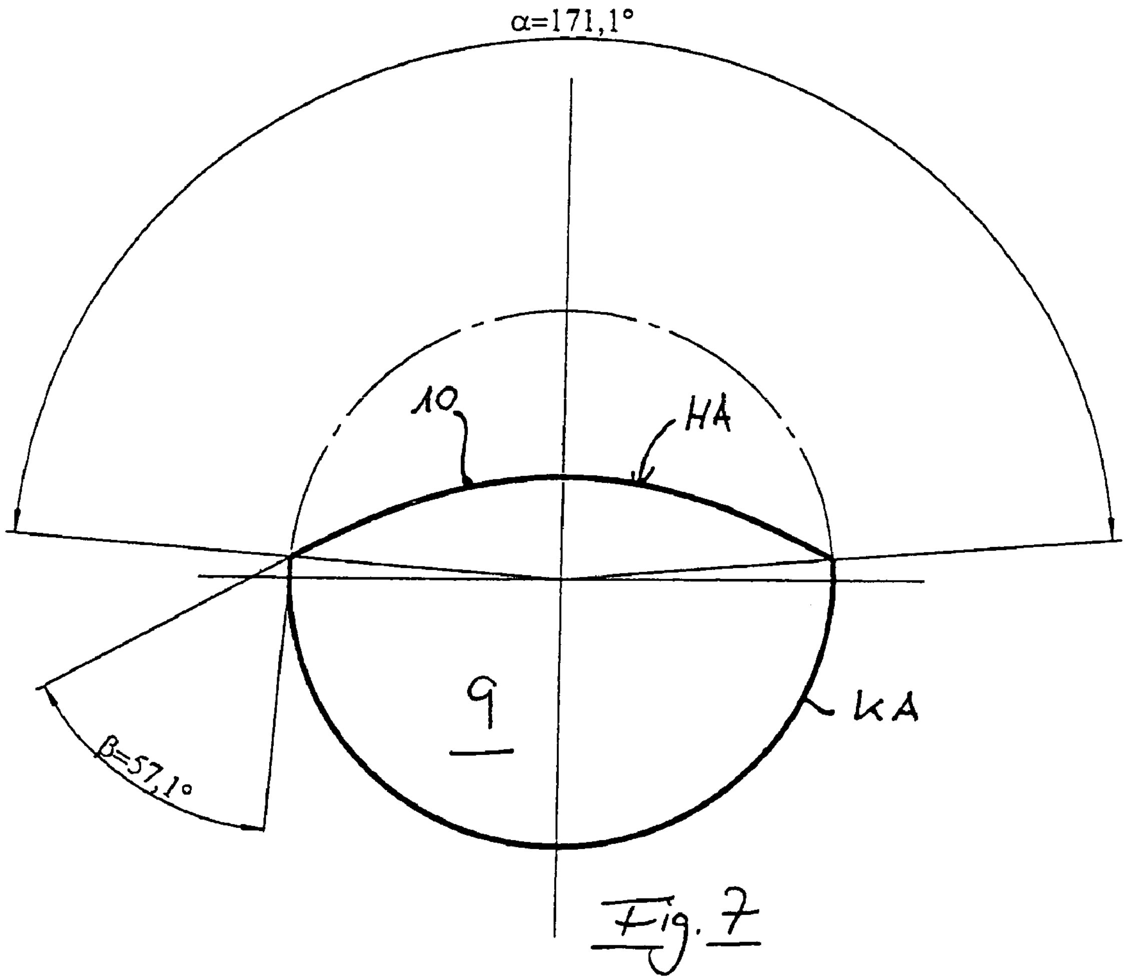

Additional preferred embodiments result from any subsequent claims as well as from the described examples and the attached drawings whereby the drawings show:

FIG. 1 a perspective view of a multipolar electrode configuration according to one of the embodiments of the current invention;

FIG. 2 a frontal view of the electrode configuration shown in FIG. 1;

FIG. 3 a frontal view of one of two half-bowls shown in FIG. 2;

FIG. 3A a frontal view according to FIG. 3 together with a grindstone for the processing of the electrode configuration;

FIG. 3B a perspective view of a multipole electrode configuration according to another embodiment of the current invention;

FIG. 4 a schematic cross section of an electrode blank with an illustration of the hyperbolic surfaces at the electrode after processing and FIG. 5 to 7 schematic cross-sectional views of additional electrode blanks.

FIG. 1 shows a multipole electrode configuration 1 for the focussing or mass filtration of a beam of charged particles. The electrode configurations consist of four elongated electrodes 2, which are arranged parallel to an axis, which are attached, upon insertion of insulating members 3, to support elements 4. Each electrode is connected to two support elements 4, namely a front and a back support element, upon insertion of a respective insulating member 3 at both sides. The connection is carried out via gluing or soldering.

FIG. 2 shows the electrode configuration of FIG. 1 in a frontal view. Each support element 4 is basically formed like a semi circle. In this way the two electrodes 2, which are connected via an insulating member 3 to a support element 4, form a half shell of the electrode configuration 1. A number of such support elements 4—in this example two support elements—are fitted together in such a way that they form a closed support body, consisting of many parts, which encloses the electrodes 2.

The end parts 6 of each support element 4 are different, but shaped correspondingly. I.e. the end part 6 of a first support element 4 is shaped in such a way that an end part of a second support element can be fitted together with the end part of the first support element in such a way that a self-centring of the two support elements occurs. For this purpose a first end part 6 of a support element 4 has a convex shape while the other end part of the same support element has a corresponding concave shape. For example the convex shaped end part might be roof-like, i.e., formed from two substantially plane surfaces angled against each other, while the concave shaped end part is shaped as the negative image, i.e. as a channel with two angled, substantially plane surfaces.

As indicated in FIG. 1, one end part of a support element 4 shows a drill hole 7, which is thread-less, whilst the other end part i.e the opposite end part, exhibits a threaded drill hole (not shown) where a screw 8 can be inserted. All four support elements are formed identically. Therefore, only one type of support element is required.

The electrodes 2 is constituted preferably of graphite, metal or an alloy with small expansion coefficients such as iron-nickel alloys or iron-nickel-cobalt alloys such as Invar, Vacon or similar materials. The insulating members 3 are constituted of a non-conductor such as quartz, quartz glass, ceramic or plastic.

The semi-circle shaped support elements 4 are also constituted of graphite, metal or an alloy preferably with a small expansion coefficient such as iron-nickel alloys or iron-nickel-cobalt alloys, such as Invar, or similar materials. In particular they are constituted of the same material as the electrodes 2.

After the electrodes 2 of a half shell 5 are glued or soldered upon insertion of insulating members 3 to the front and the back support element 4, the electrodes and preferably the end parts of the support elements 4 are processed. The processing occurs via form grinding, eroding and/or other shape defining processes in such a way that in one single process-step a hyperbolically shaped surface or a similarly curved surface is created on an initially round electrode blank and, at the time, the end parts 6 of the support elements 4 are shaped in a concave or convex contour.

In this way two half shells are formed which are then screwed together using screws 8 and the drill hole 7 and the threaded drill holes, which are not shown, to form a quadrupole mass spectrometer. FIG. 3 shows an enlarged view of one of the half shells. FIG. 3A shows said half shell together with a grindstone for the processing of the electrodes 2 and the end parts 6 of the support elements 4. The grindstone S is put onto the electrodes 2 and the end parts 6 and the grindstone S is moved backwards and forwards, relative to the electrodes 2 and the end parts 6, in a longitudinal direction until the electrodes 2 and the end parts 6 have the desired shape.

FIG. 3B shows another embodiment of the electrode configuration 1' according to the current invention, which comprises,—just as in the embodiment described in the previous figures—four elongated, parallel orientated electrodes 2, which upon insertion of insulating members 3' are attached to the support elements 4'. Different from the embodiment shown in FIG. 1 the support elements 4' are significantly longer and extend along a larger part of the electrodes 2. It is therefore sufficient in this embodiment to only use one support element 4' for each half shell on to which two electrodes can subsequently be attached. Due to said elongated support element 4' the electrodes 2 can be attached in many places, upon insertion of additional insulating members 3', to the support elements 4'. This results in a more stable configuration of the electrodes 2 and thus misalignment of the electrodes 2 can be avoided or can be substantially reduced. In the example shown in FIG. 3B the upper support element 4' shows an opening A just in order to illustrate the inside of the electrode configuration 1'. Through this opening A it can be seen that the electrodes 2 are attached to the respective support elements 4', using additional insulating members 3' for example in the centre of the electrode configuration 1'. The opening A is only shown for illustration purposes, i.e. the support elements 4' are preferably formed without any such openings (apart from drill holes or threaded drill holes for the attachment of the support elements 4' to each other or openings for the improvement of the pump-out characteristics and therefore a vacuum within the electrode configuration).

Apart from their length, the support elements 4' shown in FIG. 3B are not substantially different from the support elements 4 shown in FIG. 1 to FIG. 3A so that any further description or details of the previous drawings will also apply to the modified situation described in FIG. 3B.

In the previous section the creation of a quadrupole, using two half shells, was described. In principle however, it is possible to create other multipole electrode configuration with said method. For example, a hexapole configuration can be created with the described method that either consists of two half shells with three electrodes or of three third shells with two electrodes.

Alternatively, the described method can be used to create an octopole electrode configuration that either consists of four quarter shells with two electrodes each or of two half shells with four electrodes each.

All of the described electrode configurations have in common the fact that the electrodes 2 are arranged in such a way that they form identical angles with respect to the centre axis of the electrode configuration. In this way a high degree of symmetry can be achieved for the field that is created between said electrodes.

The described method results in an electrode configuration with extremely straight electrode poles, which are very parallel to each other whereby the entire system, due to the shaping of the end parts, can be assembled symmetrically. The accuracy of the electrode surfaces, which can be achieved using the described method, is in the region of less than 1 μm. Even though extremely high accuracy can be achieved, the production of the individual sub shells (half shells, third shells, quarter shells etc) itself is relatively simple.

It was further discovered that hyperbolically shaped electrodes only produce good results if the body of the electrodes is relatively large so that field disturbances, which are caused by the sharp cut-off of the field, can be neglected. Conversely, round electrodes located in the centre of the configuration exhibit a large field error, which decrease towards the edge of the electrodes since the field does not stop abruptly but decreases smoothly due to the rounding of the electrodes.

As a result of this discovery differently shaped electrodes were found which are illustrated in FIG. 4. In FIG. 4 a round-pole electrode blank 9 is depicted which shows a circular contour. The blank 9 is, prior to processing,—according to its orientation shown in FIG. 4—grinded down on its right side to give it a hyperbolical shape 10. The corresponding hyperbolical section HA is defined via the angle α, which relates to the circle centre point of the electrode blank 9 and to the intersection points P, P' of the circular section KA, resulting from the grinding process, and the hyperbolical section HA. The angle α is preferably larger or equal to 45°. Preferably the angle α should be between 45° and 90°.

At each of the intersection points P and P', a tangent can be constructed at the circle K, which is encircling the blank, as well as an additional tangent which can be constructed at the hyperbole of the hyperbolical section HA. Both tangents enclose an angle β, that preferably is less than 45° but ideally it is less than 30°. In the examples shown in FIG. 3 and FIG. 4 the angle α is approximately 90° and the angle β is approximately 14°.

In FIG. 4 the hyperbole asymptotes are depicted as dashed lines and their intersection point is marked as M. Preferably this intersection point coincides with the centre of the electrode configuration M. The smallest distance of the electrodes after the grinding process, i.e. the distance between the hyperbolical section HA of the electrode to the centre M of the electrode configuration, is shown as $r_0$ in FIG. 4. FIG. 4 only illustrates one quadrant of a quadrupole with a centre M.

In FIG. 5 and FIG. 7 additional examples of processed and grinded round poles are shown. In the example shown in FIG. 5 the round pole blank 9 is ground in such a way that the hyperbolical section HA encloses an angle α=54.4°, resulting in an angle β=3.3°.

In the example shown in FIG. 6 the round pole blank 9 is ground in such a way that the hyperbolical section HA encloses an angle α=87.4°, resulting in an angle β=14°.

Electrodes that are ground in a way as shown in FIG. 5 and FIG. 6 have the advantage of a smooth transition from the hyperbolical section HA to the circular section KA of the electrode. Additionally, only a very small part of the electrode blank needs to be removed. Furthermore, less expensive round poles can be used as starting material resulting in cheaper electrodes for multipole electrode configuration with very high alignment accuracy.

The invention is not limited to the previously described ratios of the hyperbolic section HA to the circular section KA. The invention also allows for a wider window for this ratio as illustrated in FIG. 7. In this example the angle of the hyperbolical section HA is α=171.1°, resulting in an angle β=57.1°.

All previously mentioned numerical values do not imply any limitation of the current invention with respect to such values. Values, differing by +/−10% to 30% from the values used in the examples, should also be considered to be disclosed.

The invention claimed is:

1. A method for the production of a multipolar electrode configuration (1) for focussing or mass filtration of a beam of charged particles, whereby the configuration comprises a number of elongated electrodes (2) which are orientated parallel to an axis, whereby the method comprises the following steps:

a) attaching number of round-pole shaped electrode blanks (9)—but only a fraction of the total number of electrodes (2) required for a number of said electrode configuration (1)—to one or a number of support elements (4), b) simultaneous processing of the end parts (6) of the support element(s) (4) and of the electrode blanks (9)

attached to this (these) support element(s) (4) in one process step in such a way that each electrode blank (9) is processed into an electrode (2) with a cross section, having a circular section (KA) and a non-circular, preferably substantially hyperbolical section (HA), and at the end of said simultaneous processing the support element(s) (4) having two differently shaped end parts (6), whereby the respective shapes of said end parts (6) are adapted to each other, c) the steps a) and b) are carried out multiple times until the number of electrodes (2) required for the electrode configuration (1) has been provided, whereby in step a) one or a number of support elements (4) can respectively be used for attachment, and d) the support elements (4) together with the attached electrodes (2) are fitted together in such a way, that multiple support elements (4) forming one or multiple closed support bodies (5), that consist of multiple parts, which are enclosing the electrodes (2).

2. A method according to claim 1 whereby in step a) the electrode blanks (9), upon insertion of at least one insulating member (3), are attached to the support element(s) (4) in order to electrically isolate the electrode blank (9) and the support element (4).

3. A method according to claim 2 characterised in that the insulating member (3) is a non-conductor, preferably quartz or quartz glass, ceramic and/or synthetic material.

4. A method according to claim 1 characterised in that each electrode blank (9) and/or each support element (4) consists of graphite, metal or an alloy, whereby the thermal expansion coefficient of the graphite, metal or alloy is substantially the same as the thermal expansion coefficient of the insulating member (3).

5. A method according to claim 1 characterised in that each support element (4) comprises two end parts (6) whereby one end part has a concave shape and the other has a convex shape.

6. A method according to claim 1 characterised in that each support element (4) comprises at each end parts (6) a drill hole (7) or a threaded drill hole.

7. A method according to claim 6 characterised in that each support element (4) comprises a thread-less drill hole (7) at one of its end parts (6) and a threaded drill hole at the other end part.

8. A method according to claim 1 characterised in that the processing involves grinding, eroding and/or other shape giving processes.

9. A method according to claim 1 characterised in that in step a) two electrode blanks (9), upon insertion of respective insulating member (3), are attached to two support elements (4), the steps a) and b) are carried out twice so that four electrodes (2) are provided for the electrode configuration and in step d) two support elements (4) are joined together, respectively, to form a support body (5) which consists of multiple parts.

10. A multipolar electrode configuration for focussing or mass filtration of a beam of charged particles, whereby the configuration comprises a number of elongated electrodes (2) which are orientated parallel to an axis, whereby:

a) two or more electrodes (2)—but only a fraction of the total number of electrodes (2) required for the electrode configuration (1)—are attached to one or a number of support elements (4) which are formed separately from the electrodes (2), b) each electrode (2) comprises a cross section with a circular section (KA) and a non-circular, preferably hyperbolical section (HA), c) each support element (4) comprises two differently shaped end parts (6), whereby the respective shapes of said end parts (6) are adapted to each other, and d) the support elements (4) inclusive of the electrodes (2) attached thereto, are fitted together in such a way, that a number of support elements (4) form one or a number of support bodies (5) each consisting of multiple parts and enclosing the electrodes (2).

11. A multipolar electrode configuration according to claim 10 characterised by the fact that each electrode (2) is attached to the support element(s) (4) upon insertion of at least one insulating member (3) in order to electrically isolate the electrode (2) and the support element (4).

* * * * *